United States Patent
Symanow et al.

(10) Patent No.: US 10,752,116 B2
(45) Date of Patent: Aug. 25, 2020

(54) VEHICLE BACKUP ELECTRICAL POWER SYSTEM

(71) Applicant: Ford Global Technologies, LLC, Dearborn, MI (US)

(72) Inventors: David Anthony Symanow, Plymouth, MI (US); Ray C. Siciak, Ann Arbor, MI (US); Michael Adel Awad Alla, Novi, MI (US); Sami Dagher, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 197 days.

(21) Appl. No.: 15/922,989

(22) Filed: Mar. 16, 2018

(65) Prior Publication Data
US 2019/0283609 A1 Sep. 19, 2019

(51) Int. Cl.
*B60L 3/00* (2019.01)
*G05D 1/00* (2006.01)
*B60R 16/033* (2006.01)
*H02J 9/06* (2006.01)

(52) U.S. Cl.
CPC .......... *B60L 3/0092* (2013.01); *B60R 16/033* (2013.01); *G05D 1/0088* (2013.01); *H02J 9/06* (2013.01); *B60L 2240/547* (2013.01)

(58) Field of Classification Search
CPC ........ B60L 58/20; B60L 3/0007; H02J 9/061; Y02T 10/70; Y02T 10/7055; Y02T 10/7066
See application file for complete search history.

(56) References Cited

U.S. PATENT DOCUMENTS

| | | | | |
|---|---|---|---|---|
| 4,451,742 A * | 5/1984 | Aswell | ...................... | G06F 1/28 307/66 |
| 4,792,743 A * | 12/1988 | Tsujino | ................. | H02J 7/0031 320/124 |
| 5,488,283 A * | 1/1996 | Dougherty | ........ | H01M 10/0413 307/10.1 |
| 5,530,336 A * | 6/1996 | Eguchi | .................. | H02J 7/0013 320/118 |
| 5,736,793 A * | 4/1998 | Jahrsetz | .............. | B60R 25/1018 180/287 |
| 5,739,596 A * | 4/1998 | Takizawa | ................ | G06F 1/263 307/64 |
| 7,852,046 B2 * | 12/2010 | Krah | ....................... | H02J 9/061 320/103 |
| 7,863,845 B2 * | 1/2011 | Kasai | ..................... | B62D 5/046 318/139 |

(Continued)

FOREIGN PATENT DOCUMENTS

CN 201937323 U 8/2011
DE 102006035803 A1 2/2008

(Continued)

*Primary Examiner* — Anne Marie Antonucci
*Assistant Examiner* — Sahar Motazedi
(74) *Attorney, Agent, or Firm* — Frank A. MacKenzie; Bejin Bieneman PLC (57) ABSTRACT

An electrical power system for a vehicle includes an interface electrically connected to a node and a battery electrically connected to the interface. The interface includes circuit elements that permit current flow between the battery and the node when and only when the voltage of the node is below a threshold.

14 Claims, 4 Drawing Sheets

(56) References Cited

U.S. PATENT DOCUMENTS

| | | | |
|---|---|---|---|
| 8,248,023 B2* | 8/2012 | Schwenke | B60L 58/24 |
| | | | 320/104 |
| 8,831,808 B2* | 9/2014 | Stanek | B60L 58/13 |
| | | | 701/22 |
| 8,884,460 B2 | 11/2014 | Wagner | |
| 9,236,752 B2* | 1/2016 | Bajaj | H02J 7/0052 |
| 9,806,523 B2* | 10/2017 | Stratakos | H02J 3/383 |
| 9,868,410 B2* | 1/2018 | Namuduri | B60R 16/033 |
| 10,259,448 B2* | 4/2019 | Bucknor | B60K 6/387 |
| 2012/0091812 A1* | 4/2012 | Lin | H02J 7/0068 |
| | | | 307/66 |
| 2014/0347458 A1* | 11/2014 | Tijerina | G06K 9/00369 |
| | | | 348/77 |
| 2015/0357864 A1* | 12/2015 | Gofman | H02J 7/0045 |
| | | | 307/66 |
| 2017/0080883 A1* | 3/2017 | Yasunori | B60R 16/02 |
| 2018/0052463 A1* | 2/2018 | Mays | B60T 17/18 |
| 2018/0191185 A1* | 7/2018 | Al Rasheed | H02J 7/0054 |
| 2019/0092257 A1* | 3/2019 | Boecker | B60R 16/03 |
| 2019/0109479 A1* | 4/2019 | Tsujioka | B60R 16/03 |

FOREIGN PATENT DOCUMENTS

| | | |
|---|---|---|
| JP | 6217908 B2 | 10/2017 |
| KR | 20160103465 A | 9/2016 |

\* cited by examiner

VEHICLE BACKUP ELECTRICAL POWER SYSTEM

BACKGROUND

Vehicles generate power both to propel the vehicle and to supply various electrical loads in the vehicle. Types of power systems include a conventional powertrain including an internal-combustion engine coupled to a transmission that transfers rotational motion to wheels; an electric powertrain including batteries, an electric motor, and a transmission that transfers rotational motion to the wheels; and a hybrid powertrain including elements of the conventional powertrain and the electric powertrain. In vehicles with conventional powertrains, an alternator transforms rotational kinetic energy from the engine into electrical energy for the electrical loads. In all-electric and hybrid-electric vehicles, a DC/DC converter may convert between high-voltage electrical energy for propelling the vehicle and low-voltage energy for the electrical loads.

DETAILED DESCRIPTION

An electrical power system for a vehicle includes an interface electrically connected to a node, and a battery electrically connected to the interface. The interface includes circuit elements that permit current flow between the battery and the node when and only when the voltage of the node is below a threshold.

The electrical power system may further include a control module, and the interface may be communicatively coupled to the control module. The circuit elements of the interface may transmit a signal to the control module when the voltage of the node is below the threshold. The control module may be programmed to instruct a vehicle computer to put the vehicle in a minimal risk condition in response to the voltage of the node being below the threshold. Putting the vehicle in a minimal risk condition may be driving the vehicle to a roadside.

At least one of the circuit elements of the interface may be a field-effect transistor electrically connected to the node and the battery. The circuit elements of the interface may include a plurality of field-effect transistors including the field-effect transistor, and the field-effect transistors may be electrically connected in parallel to the node and the battery. The circuit elements of the interface may include a plurality of comparators electrically connected to the respective field-effect transistors.

The circuit elements of the interface may include an or-gate electrically connected to each of the field-effect transistors. The electrical power system may further include a control module, and the or-gate may be electrically connected to the control module.

The battery may be a first battery, and the electrical power system may further include a second battery electrically connected to the node.

An electrical power system for a vehicle includes a battery and means for permitting current flow between the battery and a node when and only when the voltage of the node is below a threshold.

The electrical power system may further include means for putting the vehicle in a minimal risk condition in response to the voltage of the node being below the threshold. Putting the vehicle in a minimal risk condition is driving the vehicle to a roadside.

A control module includes a processor and a memory storing processor-executable instructions, and the processor is programmed to instruct an autonomous-driving computer of the vehicle to put the vehicle in a minimal risk condition in response to a signal from an interface that a voltage of a node is below a threshold. An electrical power system for a vehicle includes the node, and the interface is electrically connected to the node and a battery.

Putting the vehicle in a minimal risk condition may be driving the vehicle to a roadside.

With reference to the Figures, an electrical power system 30 for a vehicle 32 includes at least one interface 34 electrically connected to one of at least one powernet 36, 38, and at least one MRC battery 40 electrically connected to the interface 34. The interface 34 includes circuit elements 42, 44, 46 that permit current flow between the battery and the powernet 36, 38 when and only when the voltage of the powernet 36, 38 is below a threshold.

The electrical power system 30 provides high reliability. In a situation in which the voltage of the powernet 36, 38 drops, the interface 34 connects the MRC battery 40 to the powernet 36, 38, ensuring a supply of power to loads 48 connected to the powernet 36, 38. During normal operation, the MRC battery 40 is disconnected from the powernet 36, 38. The MRC battery 40 thus does not experience aging effects such as the accumulation of waste products caused by charging and discharging, which can make battery performance less predictable. Moreover, the MRC battery 40 is always at a known state of charge without the need for a battery monitoring system and without the need for a charging strategy, either of which can introduce additional unreliability. The electrical power system 30 may qualify for an ASIL D rating, the highest rating on the Automotive Safety Integrity Level scale defined by ISO 26262, propagated by the International Organization for Standardization.

Figure 1:
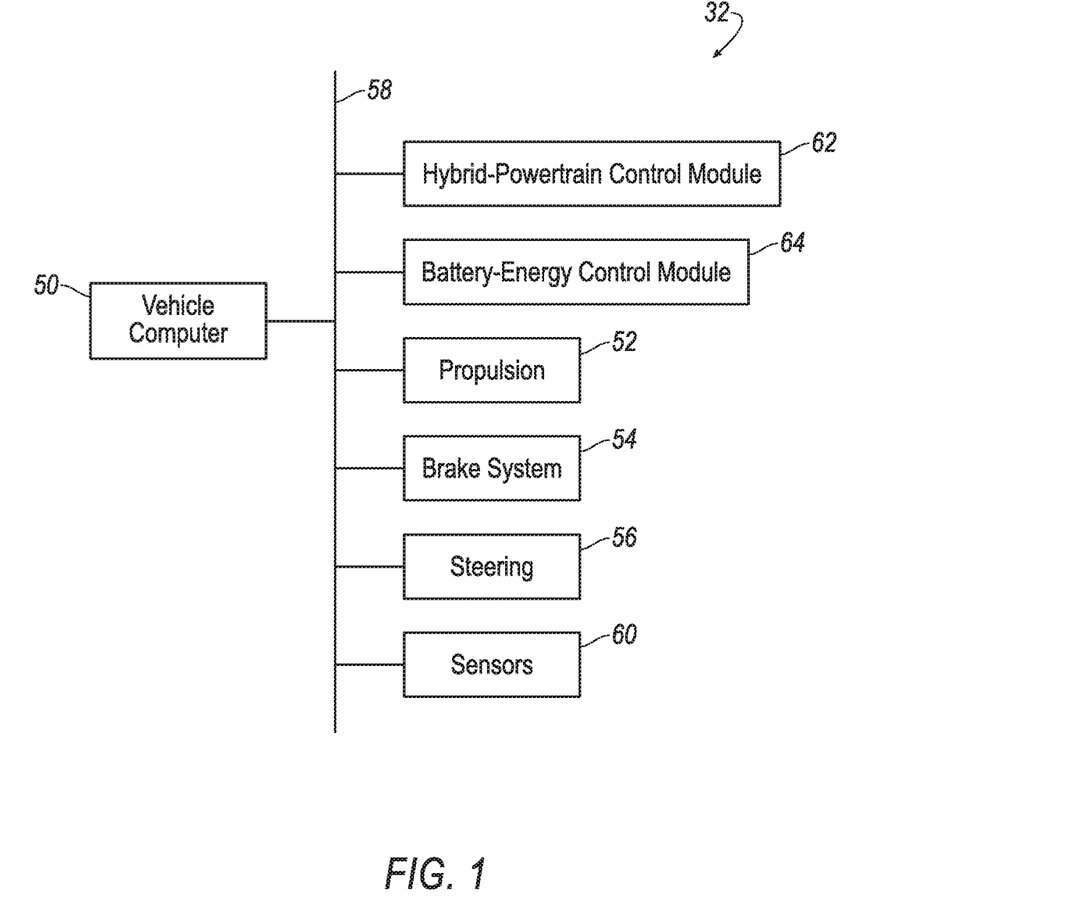
FIG. 1 is a block diagram of an example vehicle.

With reference to FIG. 1, the vehicle 32 may be an autonomous vehicle. A vehicle computer 50 can be configured to operate the vehicle 32 independently of the intervention of a human driver, completely or to a lesser degree. The vehicle computer 50 may be programmed to operate a propulsion 52, a brake system 54, a steering 56, and/or other vehicle systems. For the purposes of this disclosure, autonomous operation means the vehicle computer 50 controls the propulsion 52, brake system 54, and steering 56 without input from a human driver; semi-autonomous operation means the vehicle computer 50 controls one or two of the propulsion 52, brake system 54, and steering 56 and a human driver controls the remainder; and nonautonomous operation means a human driver controls the propulsion 52, brake system 54, and steering 56.

The vehicle computer 50 is a microprocessor-based computer. The vehicle computer 50 includes a processor, memory, etc. The memory of the vehicle computer 50 includes memory for storing instructions executable by the processor as well as for electronically storing data and/or databases.

The vehicle computer 50 may transmit and receive data through a communications network 58 such as a controller area network (CAN) bus, Ethernet, WiFi, Local Interconnect Network (LIN), onboard diagnostics connector (OBD-II), and/or by any other wired or wireless communications network. The vehicle computer 50 may be communicatively coupled to the propulsion 52, the brake system 54, the steering 56, sensors 60, a hybrid-powertrain control module 62, a battery-energy control module 64, and other components via the communications network 58.

Figure 2:
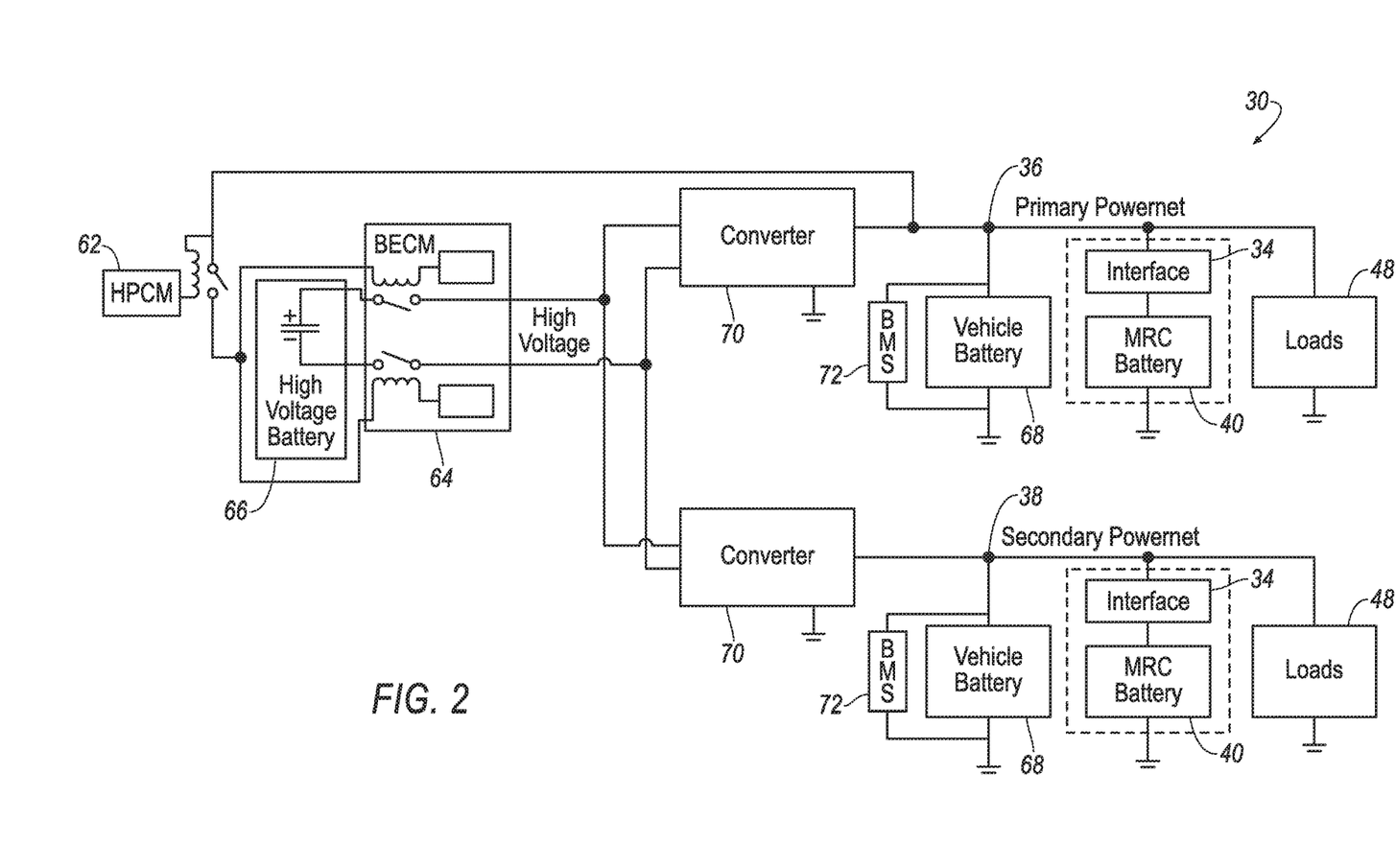
FIG. 2 is a circuit diagram of an example electrical power system for the vehicle of FIG. 1.

The propulsion 52 of the vehicle 32 generates energy and can translate the energy into motion of the vehicle 32. The propulsion 52 may be a known vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain (as shown in FIG. 2); or any other type of propulsion. If hybrid, the propulsion 52 may include a powertrain arranged in any hybrid manner, e.g., a series-hybrid powertrain, a parallel-hybrid powertrain, a power-split (series-parallel) hybrid powertrain, etc. The propulsion 52 can include an electronic control unit (ECU) or the like, such as the hybrid-powertrain control module 62, that is in communication with and receives input from the vehicle computer 50 and/or a human driver. The human driver may control the propulsion 52 via, e.g., an accelerator pedal and/or a gear-shift lever.

The brake system 54 is typically a known vehicle braking subsystem and can resist the motion of the vehicle 32 to thereby slow and/or stop the vehicle 32. The brake system 54 may include friction brakes such as disc brakes, drum brakes, band brakes, etc.; regenerative brakes; any other suitable type of brakes; or a combination. The brake system 54 can include an electronic control unit (ECU) or the like that is in communication with and receives input from the vehicle computer 50 and/or a human driver. The human driver may control the brake system 54 via, e.g., a brake pedal.

The steering 56 is typically a known vehicle steering subsystem and controls the turning of the wheels. The steering 56 may be a rack-and-pinion system with electric power-assisted steering, a steer-by-wire system, such as are both known, or any other suitable system. The steering 56 can include an electronic control unit (ECU) or the like that is in communication with and receives input from the vehicle computer 50 and/or a human driver. The human driver may control the steering 56 via, e.g., a steering wheel.

The sensors 60 may provide data about operation of the vehicle 32, for example, wheel speed, wheel orientation, and engine and transmission data (e.g., temperature, fuel consumption, etc.). The sensors 60 may detect the location and/or orientation of the vehicle 32. For example, the sensors 60 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 60 may detect the external world, e.g., objects and/or characteristics of surroundings of the vehicle 32, such as other vehicles, road lane markings, traffic lights and/or signs, pedestrians, etc. For example, the sensors 60 may include radar sensors, scanning laser range finders, light detection and ranging (LIDAR) devices, and image processing sensors such as cameras. The sensors 60 may include communications devices, for example, vehicle-to-infrastructure (V2I) or vehicle-to-vehicle (V2V) devices.

With reference to FIG. 2, the hybrid-powertrain control module 62 is a microprocessor-based controller. The hybrid-powertrain control module 62 may include a processor, memory, etc. The memory of the hybrid-powertrain control module 62 may include memory for storing instructions executable by the processor as well as for electronically storing data and/or databases. The hybrid-powertrain control module 62 may be in communication with and may control components of the propulsion 52 such as an engine, transmission, etc. (not shown), among other functions.

The battery-energy control module 64 is a microprocessor-based controller. The battery-energy control module 64 may include a processor, memory, etc. The memory of the battery-energy control module 64 may include memory for storing instructions executable by the processor as well as for electronically storing data and/or databases. The battery-energy control module 64 may be in communication with and may monitor and control a high-voltage battery 66, one or more vehicle batteries 68, etc., among other operations.

The high-voltage battery 66 may have a voltage on the order of 250 volts. The high-voltage battery 66 may be any type suitable for providing high-voltage electricity for operating the vehicle 32, e.g., lithium-ion, lead-acid, etc. The high-voltage battery 66 may be electrically connected to the hybrid-powertrain control module 62 and to DC/DC converters 70 via the battery-energy control module 64.

The DC/DC converters 70 may convert between high-voltage direct current from the high-voltage battery 66 and low-voltage direct current flowing along a primary powernet 36 and a secondary powernet 38. The low-voltage direct current may be, e.g., 12 volts or 48 volts.

The powernets 36, 38 each electrically connect one of the DC/DC converters 70, one of the vehicle batteries 68, one of the interfaces 34, and a plurality of loads 48. Each of the powernets 36, 38 is a node. For the purposes of this disclosure, a node is defined as a point on a circuit where components of the circuit meet.

The vehicle batteries 68 are electrically connected to the respective powernets 36, 38. The vehicle batteries 68 may be low-voltage batteries, e.g., 12 volts or 48 volts. The vehicle batteries 68 may be any suitable type of battery for providing electricity to the loads 48, e.g., lithium-ion, lead-acid, etc. A battery-monitoring system 72 may be connected to each of the vehicle batteries 48. The battery-monitoring systems 72 may transmit the states of charge of the vehicle batteries 48 to, e.g., the battery-energy control module 64. The loads 48 are components of the vehicle 32 that draw electrical power to operate.

The MRC batteries 40 are electrically connected to the respective interfaces 34, which are electrically connected respectively to the primary powernet 36 and the secondary powernet 38. The MRC batteries 40 are isolated from the powernets 36, 38 other than via the interfaces 34. The MRC batteries 40 may be low-voltage batteries, and the MRC batteries 40 may have the same voltage as the vehicle batteries 68. The MRC batteries 40 may be any suitable type of battery with sufficient stored energy to power the loads 48 while the vehicle 32 is put in a minimal risk condition (described below), e.g., lithium-ion, lead-acid, etc. The MRC batteries 40 may lack battery-monitoring systems 72.

The interfaces 34 are each electrically connected to one of the powernets 36, 38 and to one of the MRC batteries 40.

The interfaces 34 each permit current flow between one of the MRC batteries 40 and the respective powernet 36, 38 when and only when the voltage of the powernet 36, 38 is below a threshold. The threshold may be chosen to ensure sufficient electrical power flows to power the loads 48. Specifically, the interfaces 34 each include the circuit elements 42, 44, 46 (described in more detail below) that permit current flow between one of the MRC batteries 40 and the respective powernet 36, 38 when and only when the voltage of the powernet 36, 38 is below the threshold. Alternatively, the interface 34 may include or be a switch operated by a controller such as the vehicle computer 50, the hybrid-powertrain control module 62, or the battery-energy control module 64, and the controller is programmed to close the switch when the voltage of the respective powernet 36, 38 is below the threshold and open the switch when the voltage of the respective powernet 36, 38 is above the threshold.

Figure 3:
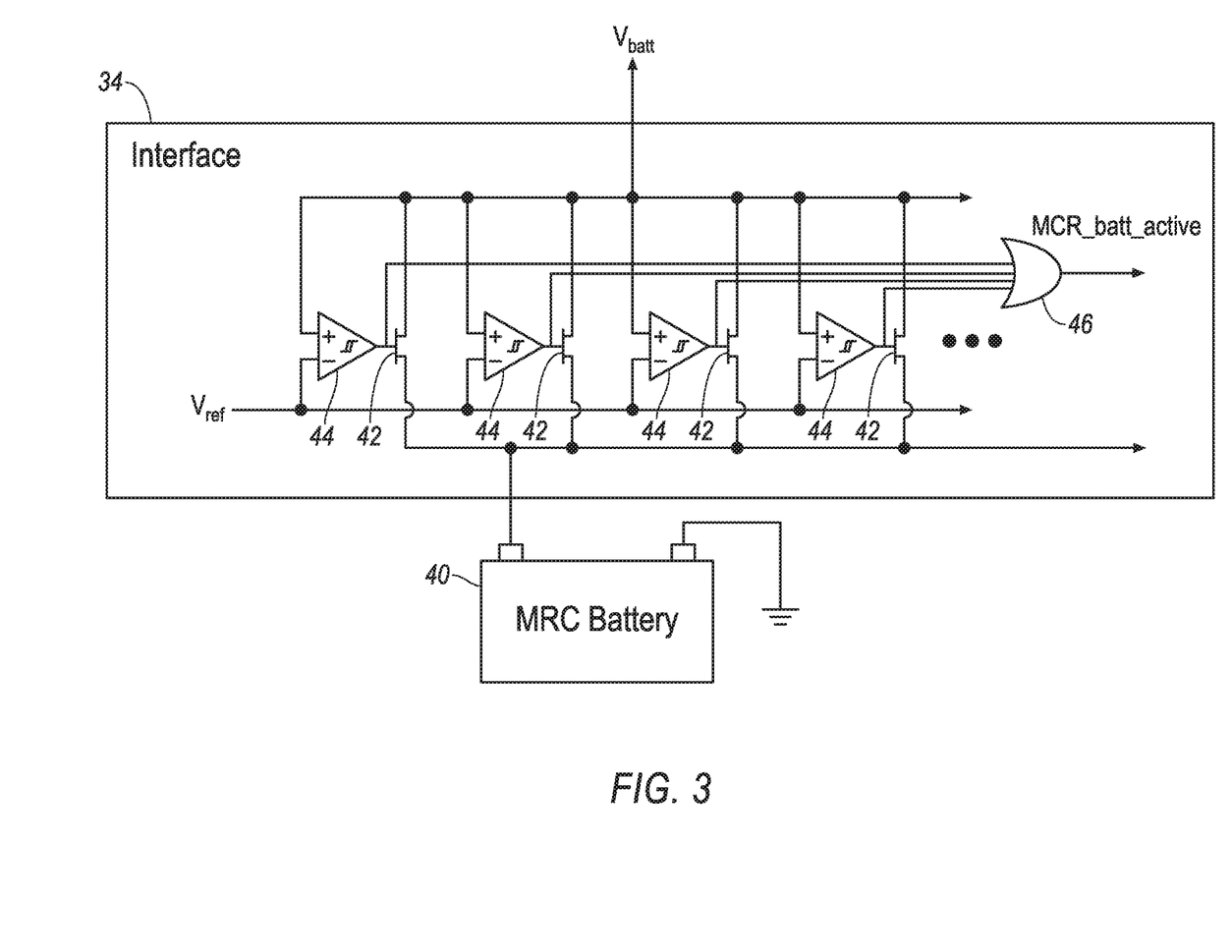
FIG. 3 is a circuit diagram of an example interface of the electrical power system of FIG. 2.

With reference to FIG. 3, the circuit elements 42, 44, 46 may include a plurality of field-effect transistors 42, a plurality of comparators 44, and an or-gate 46. The field-effect transistors 42 may be electrically connected in parallel to the MRC battery 40 and to the powernet 36, 38; e.g., the sources and drains or vice versa of the field-effect transistors 42 may be electrically connected to the MRC battery 40 and to the powernet 36, 38. The gates of the field-effect transistors 42 may be electrically connected to respective comparators 44, specifically to outputs of the respective comparators 44, and the gates of the field-effect transistors 42 may be electrically connected to the or-gate 46. The comparators 44 may be electrically connected in parallel to the powernet 36, 38 and to a reference voltage such as ground; e.g., the noninverting inputs of the comparators 44 may be electrically connected to the powernet 36, 38, and the inverting inputs of the comparator may be electrically connected to the reference voltage. The outputs of the comparators 44 may be electrically connected to the gates of the field-effect transistors 42 and to the or-gate 46. Respective inputs of the or-gate 46 may be electrically connected to respective gates of the field-effect transistors 42 and respective outputs of the comparators 44. An output of the or-gate 46 may be electrically connected to, e.g., the hybrid-powertrain control module 62 or the battery-energy control module 64.

When the voltage of the powernet 36, 38 decreases below a threshold, the circuit elements 42, 44, 46 establish an electrical connection between the MRC battery 40 and the powernet 36, 38, and the MRC battery 40 can then supply power to the loads 48 connected to the powernet 36, 38. The comparators 44 each compare the voltage $V_{batt}$ of the powernet 36, 38 with the reference voltage $V_{ref}$, e.g., ground. If the voltage $V_{batt}$ of the powernet 36, 38 is less than the reference voltage for a preset duration, each comparator applies voltage from the output to the gate of the respective field-effect transistor. The preset duration may be chosen to minimize the likelihood of transitory false positives. Each field-effect transistor 42 turns on in response to the voltage applied by the respective comparator 44, connecting the positive terminal of the MRC battery 40 to the powernet 36, 38. The comparators 44 also apply voltage to the or-gate 46, causing the or-gate 46 to transmit a signal MRC_batt_active to, e.g., the hybrid-powertrain control module 62 or the battery-energy control module 64. The respective parallel field-effect transistors 42 and comparators 44 provide redundancy so that the interface 34 still operates even if one or more of the field-effect transistors 42 or comparators 44 fails. The outputs of the comparators 44 may be latched so that an electrical connection between the MRC battery 40 and the powernet 36, 38 is persistent once established.

Figure 4:
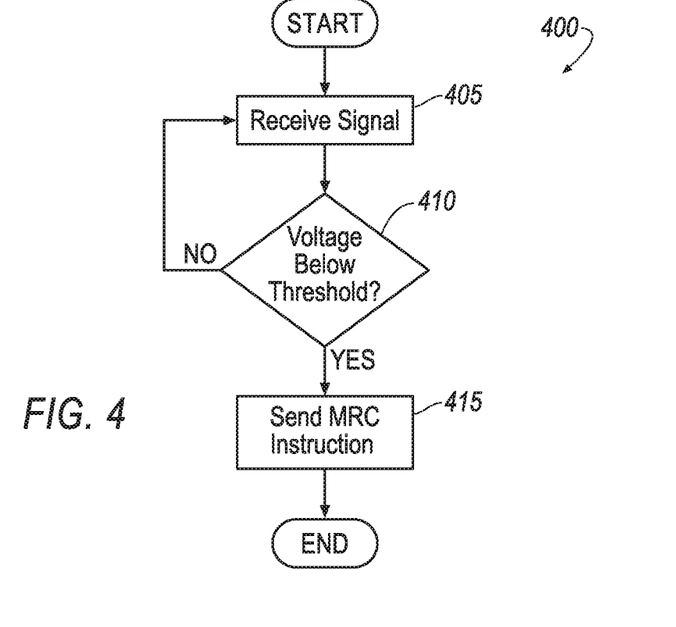
FIG. 4 is a process flow diagram of an example process for responding to a failure of the electrical power system of FIG. 2.

FIG. 4 is a process flow diagram illustrating an exemplary process for responding to a failure of the electrical power system 30. The memory of, e.g., the hybrid-powertrain control module 62 or the battery-energy control module 64 stores executable instructions for performing the steps of the process 400. In general, one of the control modules 62, 64 instructs the vehicle computer 50 to put the vehicle 32 in a minimal risk condition (described in more detail below with respect to a block 515 of a process 500) in response to the signal MRC_batt_active from the interface 34, specifically, the or-gate 46, that the voltage $V_{batt}$ of the powernet 36, 38 is below the threshold.

The process 400 begins in a block 405, in which the one of the control modules 62, 64 receives the signal MRC_batt_active from the interface 34. In particular, the signal MRC_batt_active may be transmitted by the or-gate 46. The signal may take on one of two values indicating proper functioning or failure, respectively, of the powernet 36, 38, i.e., the voltage $V_{batt}$ being above or below the threshold, based on whether any of the comparators 44 have applied voltage to the or-gate 46.

Next, in a decision block 410, the one of the control modules 62, 64 determines whether the voltage $V_{batt}$ of the powernet 36, 38 is above or below the threshold. If the signal MRC_batt_active is one of the two values, then the voltage $V_{batt}$ of the powernet 36, 38 is above the threshold, and if the signal MRC_batt_active is the other of the two values, then the voltage $V_{batt}$ of the powernet 36, 38 is below the threshold. If the voltage $V_{batt}$ is above the threshold, the process 400 returns to the block 405 to continue monitoring the voltage $V_{batt}$.

If the voltage $V_{batt}$ is below the threshold, next, in a block 415, the one of the control modules 62, 64 instructs the vehicle computer 50 to put the vehicle 32 in a minimal risk condition. After the block 415, the process 400 ends.

Figure 5:
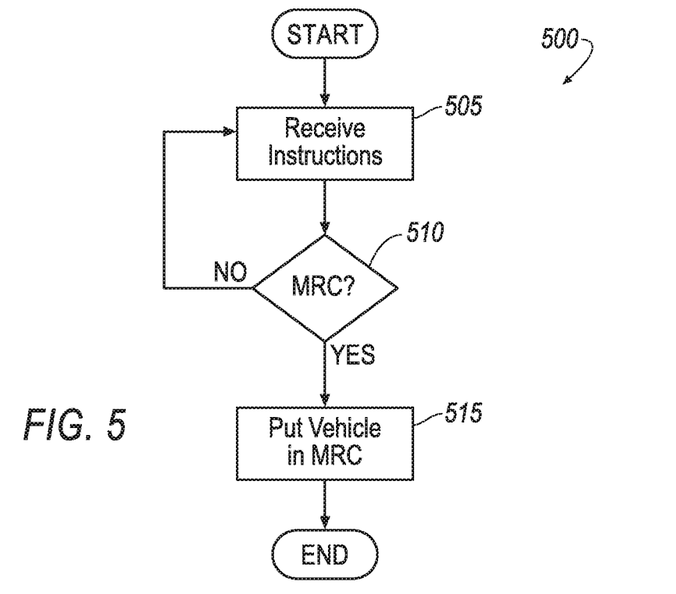
FIG. 5 is a process flow diagram of an example process for putting the vehicle of FIG. 1 in a minimal risk condition.

FIG. 5 is a process flow diagram illustrating an exemplary process 500 for putting the vehicle 32 in a minimal risk condition. The memory of the vehicle computer 50 stores executable instructions for performing the steps of the process 500. In general, the vehicle computer 50 puts the vehicle 32 in a minimal risk condition in response to an instruction from another vehicle subsystem, such as from the hybrid-powertrain control module 62 or the battery-energy control module 64, that the vehicle computer 50 do so.

The process 500 begins in a block 505, in which the vehicle computer 50 receives an instruction from one of the vehicle subsystems, such as from the hybrid-powertrain control module 62 or the battery-energy control module 64 as described with respect to the block 415 above.

Next, in a decision block 510, the vehicle computer 50 determines whether the instruction is to put the vehicle 32 in a minimal risk condition by reading the instruction. If the instruction is to perform some action other than putting the vehicle 32 in a minimal risk condition, the process 500 returns to the block 505 to continue receiving instructions.

If the instruction is to put the vehicle 32 in a minimal risk condition, next, in a block 515, the vehicle computer 50 puts the vehicle 32 in a minimal risk condition. According to the National Highway Traffic Safety Administration (NHTSA) and the Society of Automotive Engineers (SAE), "'Minimal risk condition' means low-risk operating condition that an automated driving system automatically resorts to either when a system fails or when the human driver fails to respond appropriately to a request to take over the dynamic driving task." For example, the minimal risk condition may be initiating a handover to the human driver or autonomously driving the vehicle 32 to a roadside, i.e., stopping the vehicle 32 outside active lanes of traffic. The vehicle computer 50 may store programming for only one type of minimal risk condition, or the type of minimal risk condition may be selected based on, e.g., driving context, e.g., handing operation of the vehicle 32 over to a human driver on low-speed surface streets and autonomously driving the vehicle 32 to a roadside on freeways. The vehicle computer 50 may perform the minimal risk condition, e.g., navigate to a stop on a road shoulder, by using known autonomous-operation algorithms to control the propulsion 52, the brake system 54, and the steering 56. After the block 515, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Use of "in response to" and "upon determining" indicates a causal relationship, not merely a temporal relationship. Many modifications and variations of the present disclosure are possible in light of the above teachings, and the disclosure may be practiced otherwise than as specifically described.

What is claimed is:

1. An electrical power system for a vehicle comprising:
   an interface electrically connected to a node; and
   a battery electrically connected to the interface;
   wherein the interface includes circuit elements that permit current flow between the battery and the node when and only when a voltage of the node is below a threshold;
   the circuit elements include a plurality of field-effect transistors and a plurality of comparators each paired with a respective one of the field-effect transistors;
   each field-effect transistor includes a source, a drain, and a gate;
   each comparator includes two inputs and an output;
   for each field-effect transistor, one of the source or the drain is directly electrically connected to the node, and the other of the source or the drain is directly electrically connected to a same terminal of the battery;
   for each comparator, one input is directly electrically connected to the node, and the other input is directly electrically connected to a reference node; and
   for each pairing of one field-effect transistor and one comparator, the gate of the field-effect transistor is directly electrically connected to the output of the comparator.

2. The electrical power system of claim 1, further comprising a control module, wherein the interface is communicatively coupled to the control module.

3. The electrical power system of claim 2, wherein the circuit elements of the interface transmit a signal to the control module when the voltage of the node is below the threshold.

4. The electrical power system of claim 3, wherein the control module is programmed to instruct a vehicle computer to put the vehicle in a minimal risk condition in response to the voltage of the node being below the threshold.

5. The electrical power system of claim 4, wherein putting the vehicle in the minimal risk condition is driving the vehicle to a roadside.

6. The electrical power system of claim 1, wherein the circuit elements of the interface include an or-gate electrically connected to each of the field-effect transistors.

7. The electrical power system of claim 6, further comprising a control module, wherein the or-gate is electrically connected to the control module.

8. The electrical power system of claim 6, wherein the or-gate includes a plurality of inputs and an output, and the outputs of the comparators are directly electrically connected to the inputs of the or-gate.

9. The electrical power system of claim 8, further comprising a control module, wherein the output of the or-gate is directly electrically connected to the control module.

10. The electrical power system of claim 9, wherein the control module is programmed to instruct a vehicle computer to put the vehicle in a minimal risk condition in response to a signal from the or-gate.

11. The electrical power system of claim 10, wherein putting the vehicle in the minimal risk condition is driving the vehicle to a roadside.

12. The electrical power system of claim 8, further comprising means for putting the vehicle in a minimal risk condition in response to a signal from the or-gate.

13. The electrical power system of claim 1, wherein the battery is a first battery, the electrical power system further comprising a second battery electrically connected to the node.

14. The electrical power system of claim 1, further comprising means for putting the vehicle in a minimal risk condition in response to the voltage of the node being below the threshold.

* * * * *